(12) United States Patent
Okoshi

(10) Patent No.: US 8,894,221 B2
(45) Date of Patent: Nov. 25, 2014

(54) PROJECTOR HAVING A REPLACEABLE LIGHT SOURCE DEVICE

(75) Inventor: Masayuki Okoshi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 13/104,198

(22) Filed: May 10, 2011

(65) Prior Publication Data

US 2011/0279791 A1    Nov. 17, 2011

(30) Foreign Application Priority Data

May 17, 2010   (JP) ................................. 2010-113411

(51) Int. Cl.
*G03B 21/14* (2006.01)
*G03B 21/20* (2006.01)
*H04N 9/31* (2006.01)

(52) U.S. Cl.
CPC .......... *G03B 21/2093* (2013.01); *H04N 9/3141* (2013.01); *H04N 9/315* (2013.01)
USPC .......................................... 353/119; 362/306

(58) Field of Classification Search
USPC ................................ 353/119; 313/48; 362/306
See application file for complete search history.

(56) References Cited

U.S. PATENT DOCUMENTS

| | | | |
|---|---|---|---|
| 3,761,170 A  * | 9/1973 | Genesky et al. ................. | 353/87 |
| 6,527,392 B1 * | 3/2003 | Takizawa et al. ............... | 353/34 |
| 6,799,871 B2 | 10/2004 | Shin | |
| 2009/0225282 A1 | 9/2009 | Matsumiya et al. | |

FOREIGN PATENT DOCUMENTS

| | | |
|---|---|---|
| CN | 1443314 A | 9/2003 |
| JP | 04-001585 U | 1/1992 |
| JP | 05-071837 U | 9/1993 |
| JP | 09-139583 A | 5/1997 |
| JP | 2001-209120 A | 8/2001 |
| JP | 2002-150831 A | 5/2002 |
| JP | 2002-350977 A | 12/2002 |
| JP | 3092161 U | 2/2003 |
| JP | 2004-362971 A | 12/2004 |
| JP | 2008-300731 A | 12/2008 |
| JP | 2009-211975 A | 9/2009 |

* cited by examiner

*Primary Examiner* — Thanh Luu
*Assistant Examiner* — Danell L Owens
(74) *Attorney, Agent, or Firm* — ALG Intellectual Property, LLC

(57) ABSTRACT

A projector includes a light source device, a holder that accommodates the light source device, and a resilient member formed by bending a bar-shaped metal component is provided. The holder has a receiving portion configured to pivotally support the resilient member in such a manner that the resilient member can rotate toward the inside and outside of the holder, and an engaging portion configured to engage with the resilient member to regulate the rotation of the resilient member toward the outside of the holder. The resilient member engages with the engaging portion under the condition in which the light source device is accommodated in the holder to bias the light source device toward the holder.

11 Claims, 8 Drawing Sheets

PROJECTOR HAVING A REPLACEABLE LIGHT SOURCE DEVICE

CROSS-REFERENCE

The entire disclosure of Japanese Patent Application No. 2010-113411 filed May 17, 2010 is expressly incorporated by reference herein.

BACKGROUND

1. Technical Field

The present invention relates to a projector.

2. Related Art

A projector which includes a light source device replaceable with a new light source device is known (for example, see JP-A-2009-211975).

According to a projector disclosed in JP-A-2009-211975, a light source device is fixed to an optical component housing where various types of optical components of the projector are accommodated and positioned. In this case, the light source device is fastened to the optical component housing with screws.

For replacement of the light source device with a new light source device, attachment and detachment of the light source device to and from the optical component housing is achieved by threading and removing the screws fixing the light source device to the optical component housing.

According to the projector disclosed in JP-A-2009-211975, however, threading and removal of the screws fixing the light source device to the optical component housing as the step required at the time of replacement of the light source device with the new light source device is complicated work and makes it difficult to facilitate the replacement of the light source device.

SUMMARY

An advantage of some aspects of the invention is to provide a projector which includes a light source device replaceable with a new light source device with ease.

A projector according to an aspect of the invention includes: a light source device; a holder that accommodates the light source device; and a resilient member formed by bending a bar-shaped metal component. The holder has a receiving portion configured to pivotally support the resilient member in such a manner that the resilient member can rotate toward the inside and outside of the holder, and an engaging portion configured to engage with the resilient member to regulate the rotation of the resilient member toward the outside of the holder. The resilient member engages with the engaging portion under the condition in which the light source device is accommodated in the holder to bias the light source device toward the holder.

According to this aspect of the invention, the resilient member is supported in such a manner as to be rotatable toward the inside and the outside of the holder. Thus, the resilient member rotated to the outside of the holder can be brought into a condition in which removal of the light source device from the holder is allowed (hereinafter referred to as "open position"), or the resilient member rotated to the inside of the holder can be brought into a condition in which the light source device is subjected to a biasing force of the resilient member through engagement between the resilient member and the engaging portion (hereinafter referred to as "close position").

According to this structure, the resilient member is rotated from the close position to the open position at the time of replacement of the light source device with a new light source device. As a result, the biasing of the resilient member against the light source device is released with release of the engagement between the resilient member and the engaging portion. Therefore, the light source device can be brought into the condition of removal only by rotating the resilient member from the close position to the open position.

After the light source device is removed, the new light source device is accommodated in the holder. Then, the resilient member is rotated from the open position to the close position. As a result, the resilient member comes to engage with the engaging portion. In this condition, the new light source device is subjected to the biasing force of the resilient member, and accommodated in and supported by the holder.

Accordingly, replacement of the light source device can be easily carried out as easy work which requires only rotation of the resilient member toward the open position or the close position.

It is preferable that the resilient member has an end portion extending in one direction, and a pair of extending portions formed by bending both ends of the end portion and extended substantially in the same direction, and that the receiving portion pivotally supports distal ends of the pair of the extending portions in the above aspect of the invention.

According to this structure, the resilient member has the end portion and a pair of the extending portions. The receiving portion pivotally supports distal ends of the pair of the extending portions. In this case, when the resilient member is in the close position, the resilient member can bias the light source device well enough to cover the whole light source device. Accordingly, the light source device can be supported by the holder in a more preferable condition by using the simple structure.

It is preferable that the engaging portion is disposed in a low-temperature area of the light source device in the above aspect of the invention.

Generally, the temperature of the light source device increases when the light source lamp emits light. In this case, the temperature of the holder disposed in the vicinity of the particularly high temperature area of the light source device easily rises as well, which may cause deterioration of the holder.

According to this preferable structure of the aspect of the invention, the engaging portion is disposed in the low temperature area of the holder located in the vicinity of the low temperature area of the light source device. Thus, thermal deterioration of the engaging portion caused by high temperature can be avoided. Accordingly, the life of the engaging portion increases, allowing the light source device to be supported by the holder in a preferable condition after the long-term use.

It is preferable that the distance between the engaging portion and a biasing position where the light source device is subjected to the biasing force of the resilient member is longer than the distance between the biasing position and the receiving portion in the above aspect of the invention.

According to this structure, the distance between the engaging portion and the biasing position where the light source device is subjected to the biasing force of the resilient member is set longer than the distance between the biasing position and the receiving portion. In this case, the reaction force developed on the engaging portion in response to the biasing force applied to the light source device can be reduced. Thus, deterioration of the engaging portion can be prevented even after the long-term use, allowing the light source device to be supported by the holder in a preferable condition without separation of the resilient member from the engaging portion.

It is preferable that an engaging section which engages with the light source device is formed on the bottom of the holder. In this case, the resilient member biases the position of the light source device corresponding to the engaging section in the plan view in the above aspect of the invention.

According to this structure, the light source device is accommodated and positioned in the holder by engagement with the engaging section formed on the bottom of the holder. In addition, the resilient member biases the projections of the light source device and the light source device is supported by the holder corresponding to the engaging section in the plan view. According to this structure, the light source device supported by the holder in a preferable condition by using the biasing force of the resilient member can be brought into firm engagement with the engaging section disposed at the position corresponding to the biasing position. Thus, shift of the light source device from its proper position within the holder can be securely prevented, allowing the light source device to be supported by the holder in a preferable condition.

It is preferable that the holder has a regulating portion which regulates the rotation of the resilient member toward the inside of the holder when the resilient member is rotated to the outside of the holder in the above aspect of the invention.

According to this structure, the regulating portion is provided for regulating the rotation of the resilient member toward the inside of the holder. In this case, the resilient member set at the open position during replacement of the light source device does not rotate toward the inside of the holder. Thus, the replacement work does not become complicated.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
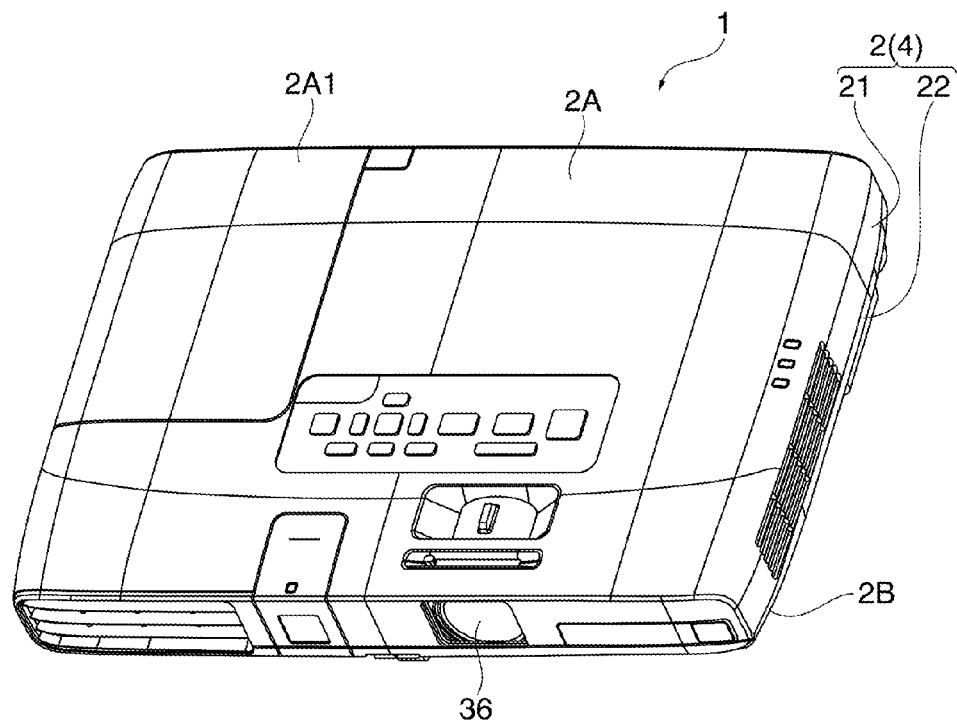
FIG. 1 is a perspective view illustrating the external appearance of a projector according to an embodiment of the invention.

An embodiment according to the invention is hereinafter described with reference to the drawings.
External Appearance of Projector FIG. 1 is a perspective view illustrating the external appearance of a projector 1 according to this embodiment. More specifically, FIG. 1 is a perspective view illustrating the projector 1 as viewed from the front side where a projection lens 36 is disposed. In the following description, the projection side of the projector 1 (the side where the projection lens 36 (FIGS. 1 and 2) is disposed) corresponds to the front side, and the side opposite to the front side corresponds to the rear side. The "upper", "lower", "left" and "right" positions in the following description correspond to the upper, lower, left, and right positions of the projector 1 placed in the condition shown in FIG. 1.

The projector 1 projects an image on a screen (not shown) to display a projection image thereon. As illustrated in FIG. 1, the projector 1 includes an external housing 2 forming the external casing.

The external housing 2 accommodates an optical unit 3 (described later) of the projector 1. As illustrated in FIG. 1, the external housing 2 includes an upper case 21 having a top surface 2A and a lower case 22 having a bottom surface 2B opposed to the top surface 2A, and forms a casing when these cases 21 and 22 are combined.

An opening 2C having a rectangular shape in the plan view (see FIG. 3) is provided at the left corner of the external housing 2 as viewed from the front side of the external housing 2 as an opening through which a light source device 31 (described later) is replaced. The opening 2C is closed by a lamp cover 2A1.
Internal Structure of Projector FIG. 2 schematically illustrates the interior of the projector 1.

Figure 2:
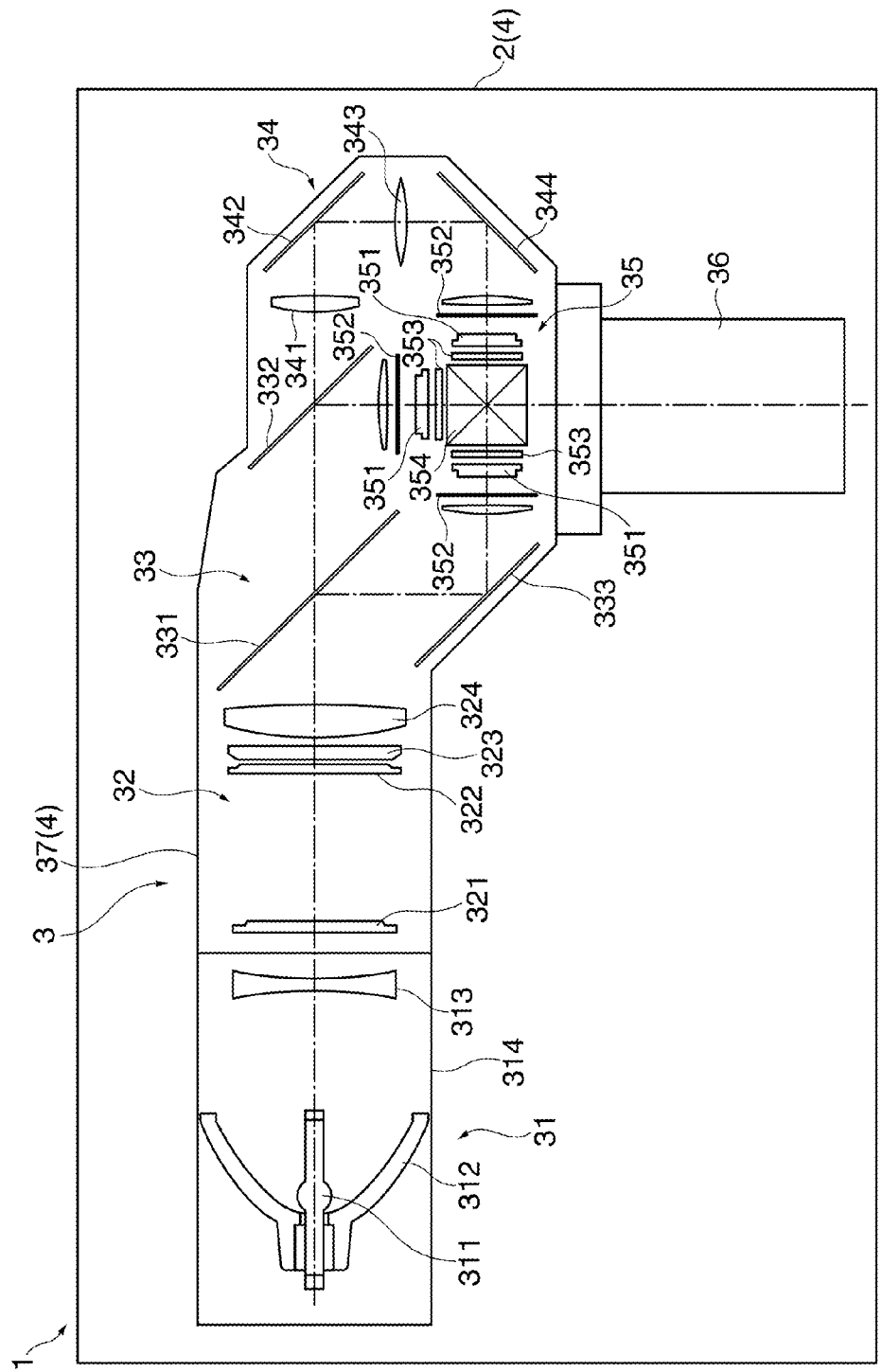
FIG. 2 schematically illustrates the interior of the projector.

The optical unit 3 shown in FIG. 2 and others are accommodated within the external housing 2.

The optical unit 3 has a substantially L shape in the plan view which extends from the left to the right along the rear surface of the external housing 2 with the right end in the extending direction bent and projected toward the front.

As illustrated in FIG. 2, the optical unit 3 includes a light source device 31 which has a light source lamp 311, a reflector 312, a collimating lens 313, and a lamp housing 314 accommodating and supporting the respective optical components 311 through 313; an illumination device 32 which has lens arrays 321 and 322, a polarization converting element 323, and a stacking lens 324; a color separation device 33 which has dichroic mirrors 331 and 332, and a reflection mirror 333; a relay device 34 which has an entrance side lens 341, a relay lens 343, and reflection mirrors 342 and 344; an optical device 35 which has three liquid crystal panels 351, three entrance side polarization plates 352, three exit side polarization plates 353, and a cross dichroic prism 354; the projection lens 36; and an optical component housing 37 which accommodates the respective optical components 32 through 35.

According to the optical unit 3 having this structure, light emitted from the light source device 31 passes through the illumination device 32, and is separated into three color lights in R, G, and B by the color separation device 33. The separated color lights are modulated by the corresponding liquid crystal panels 351. Then, the respective modulated color lights are combined by the cross dichroic prism 354, and expanded and projected onto the screen (not shown) through the projection lens 36.

Figure 3:
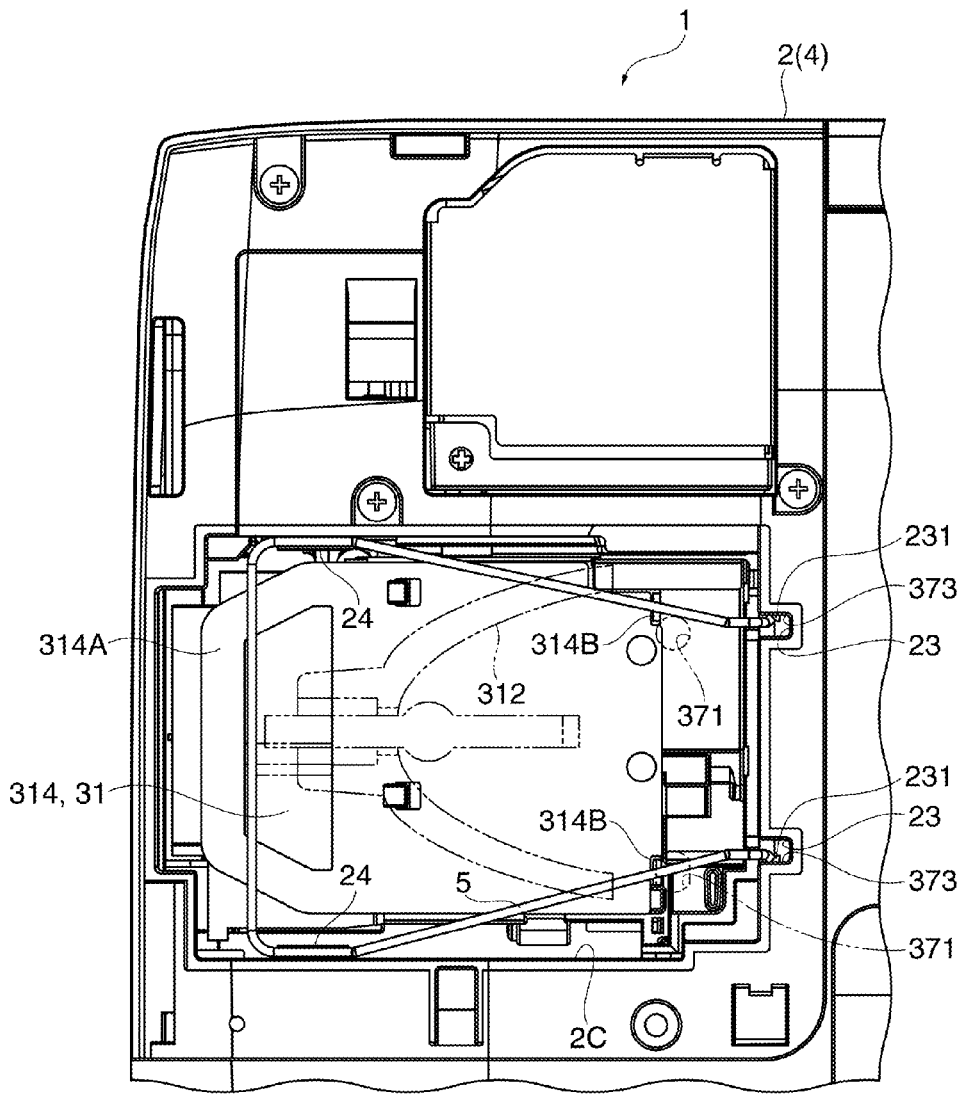
FIG. 3 is a plan view of an enlarged part of the projector, illustrating a condition in which a lamp housing is exposed according to the embodiment.
Figure 4:
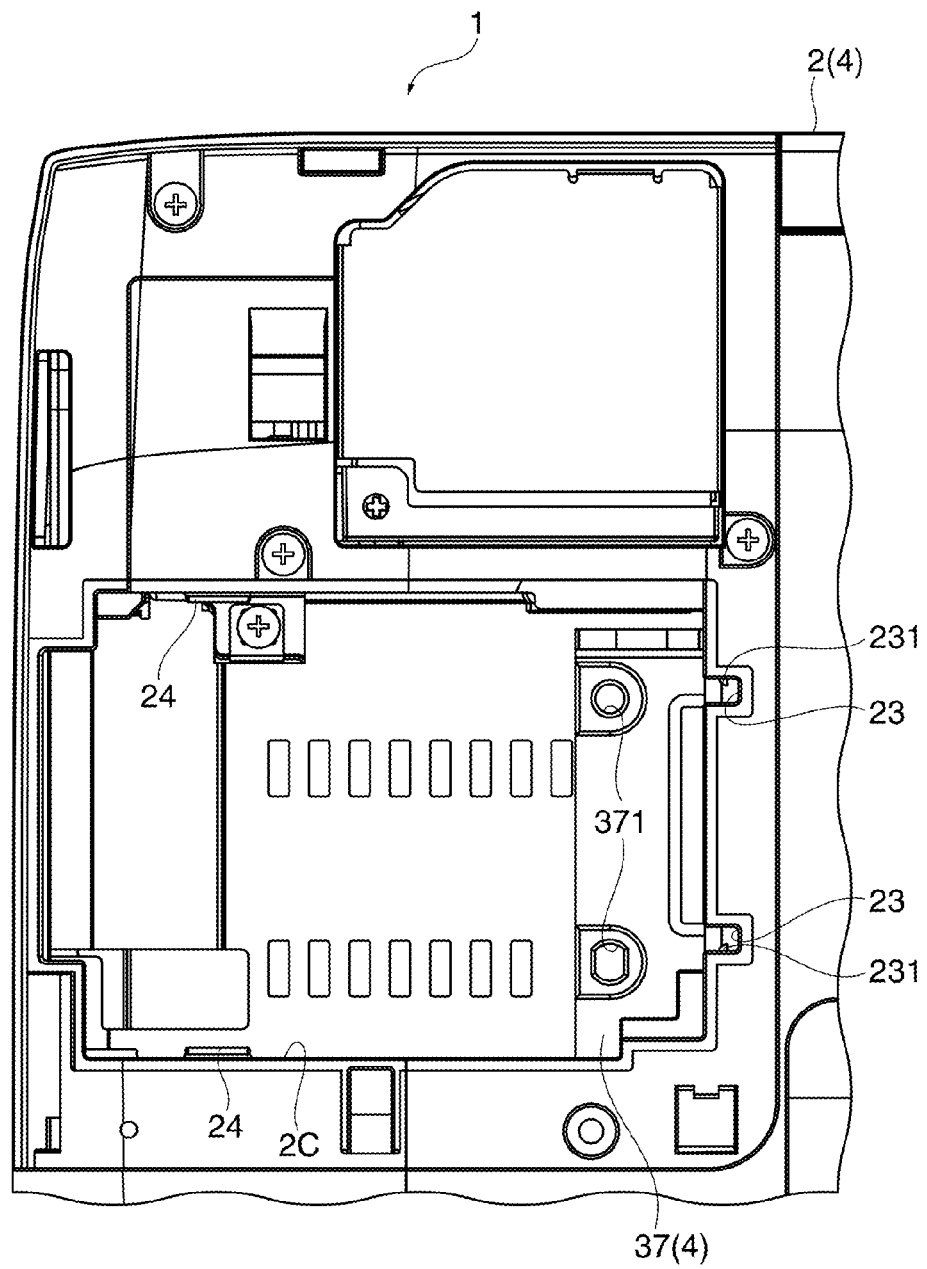
FIG. 4 is a plan view of an enlarged part of the projector, illustrating a condition in which the lamp housing is removed from the projector.
Figure 5:
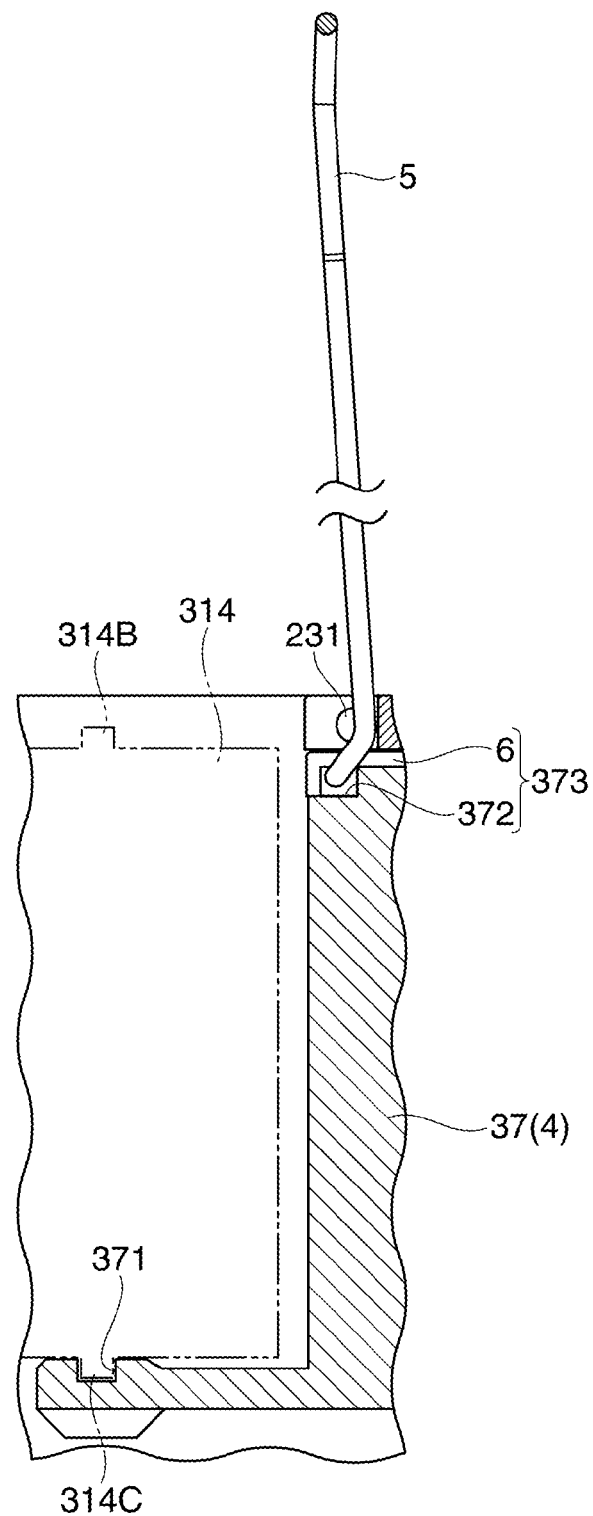
FIG. 5 is a cross-sectional view illustrating an enlarged part of the lamp housing fixed to an optical component housing.

The respective optical components 31 through 36 are available as an optical system included in various types of projectors generally used, and therefore are not specifically explained herein. In the following description, the structure of the lamp housing 314 is only touched upon.
Structure of Lamp Housing and Holder FIG. 3 is a plan view of an enlarged part of the projector 1 from which the lamp cover 2A1 is removed, illustrating a condition in which the lamp housing 314 is exposed. FIG. 4 is a plan view illustrating the part shown in FIG. 3 from which the lamp housing 314 is removed. FIG. 5 is a cross-sectional view illustrating an enlarged part of the lamp housing 314 fixed to the optical component housing 37.

The lamp housing 314 has a substantially rectangular parallelepiped shape, and is attached to the inside of the external housing 2 or removed therefrom to the outside through the opening 2C for replacement. As illustrated in FIG. 3, the top surface of the lamp housing 314 has a grip 314A held when the lamp housing 314 is attached to the inside of the external housing 2 or removed therefrom to the outside for replacement, and a pair of projections 314B brought into contact with a resilient member 5 described later.

As illustrated in FIG. 5, the bottom surface of the lamp housing 314 has engaging projections 314C projecting toward the bottom surface 2B (see FIG. 1).

The lamp housing 314 is accommodated in a holder 4 constituted by a part of the external housing 2 and a part of the optical component housing 37. As illustrated in FIGS. 4 and 5, engaging recesses 371 (engaging section) concaved toward the bottom surface 2B (see FIG. 1) are formed on the horizontally extended area of the optical component housing 37 constituting the holder 4.

As illustrated in FIG. 5, each of the engaging projections 314C of the lamp housing 314 engages with the corresponding engaging recess 371 formed on the optical component housing 37 (holder 4). As illustrated in FIGS. 3 and 5, each of the engaging projections 314C is disposed substantially opposed to the corresponding engaging recess 371.

In this arrangement, the lamp housing 314 (light source device 31) is joined to the optical component housing 37 in such a position that the light source device 31 can be disposed at a predetermined location with respect to the optical component housing 37 (holder 4). Then, the light source device 31 is fixed to that position while biased by the resilient member 5 described later as illustrated in FIG. 3.

Structure of Resilient Member

Figure 6:
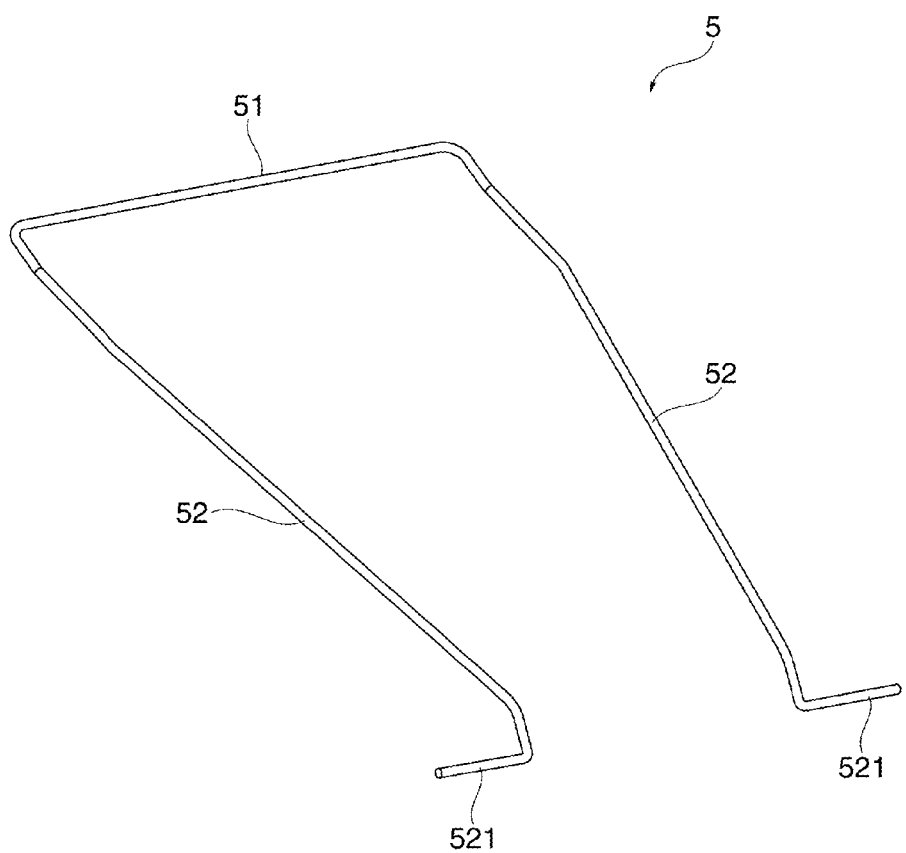
FIG. 6 is a perspective view of a resilient member according to the embodiment.

FIG. 6 is a perspective view of the resilient member 5.

As illustrated in FIG. 6, the resilient member 5 is produced by bending a bar-shaped metal component.

The resilient member 5 has an approximately U shape constituted by an end portion 51 extending in one direction, and a pair of extending portions 52 formed by bending both ends of the end portion 51 and extending substantially in the same direction.

The end portion 51 is a section to be gripped when the resilient member 5 is rotated.

Each of the extending portions 52 has a support portion 521 at one end as a section bent and extended in a direction away from each other. The extending portions 52 contact the corresponding projections 314B to bias the light source device 31. The extending portions 52 fix the light source device 31 by engagement with engaging portions 24 described later.

Support Structure of Resilient Member

As illustrated in FIG. 5, notches 372 having L shapes in the cross-sectional view are formed on the top side of the optical component housing 37 constituting the holder 4. Each of the notches 372 is covered by a sheet metal member 6 having an L shape in the cross-sectional view. The pair of the notch 372 and the sheet metal member 6 constitute a receiving portion 373 for pivotally supporting the corresponding support portion 521 of the resilient member 5. This structure allows the support portion 521 to be pivotally supported by the receiving portion 373, and rotates the resilient member 5 toward an open position where the resilient member 5 is positioned in the vertical direction and toward a close position where the resilient member 5 is positioned in the horizontal direction.

As illustrated in FIGS. 3 and 4, a pair of notches 23 having U shapes in the plan view are formed at right opening edge of the opening 2C of the external housing 2 constituting the holder 4. Each of the notches 23 is a space provided to allow the resilient member 5 to rotate through a range substantially up to 90 degrees (range between the open position and the close position).

Each of the pair of the notches 23 has a regulating portion 231 disposed on the inside of the U shape and projecting toward the inside of the U shape. The regulating portions 231 regulate the rotation of the resilient member 5 toward the close position when the resilient member 5 is set at the open position.

The specific rotating operation of the resilient member 5 will be described later.

Engaging Structure of Resilient Member

As illustrated in FIGS. 3 and 4, a pair of the engaging portions 24 for engaging with the extending portions 52 of the resilient member 5 are provided on the opening edge of the opening 2C on the front side and the rear side in the area close to the left side. By engagement with the engaging portions 24, the resilient member 5 is brought into the close position for biasing the light source device 31, and is prevented from rotation toward the open position.

As illustrated in FIG. 3, the engaging portions 24 are disposed at positions corresponding to the low-temperature area of the light source device 31, more specifically, the area where the reflector 312 is located. In addition, the distance between the engaging portions 24 and the biasing position where the resilient member 5 biases the light source device 31 (the positions of the projections 314B) is set longer than the distance between the biasing position and the receiving portions 373.

Replacement of Light Source Device

Figure 7:
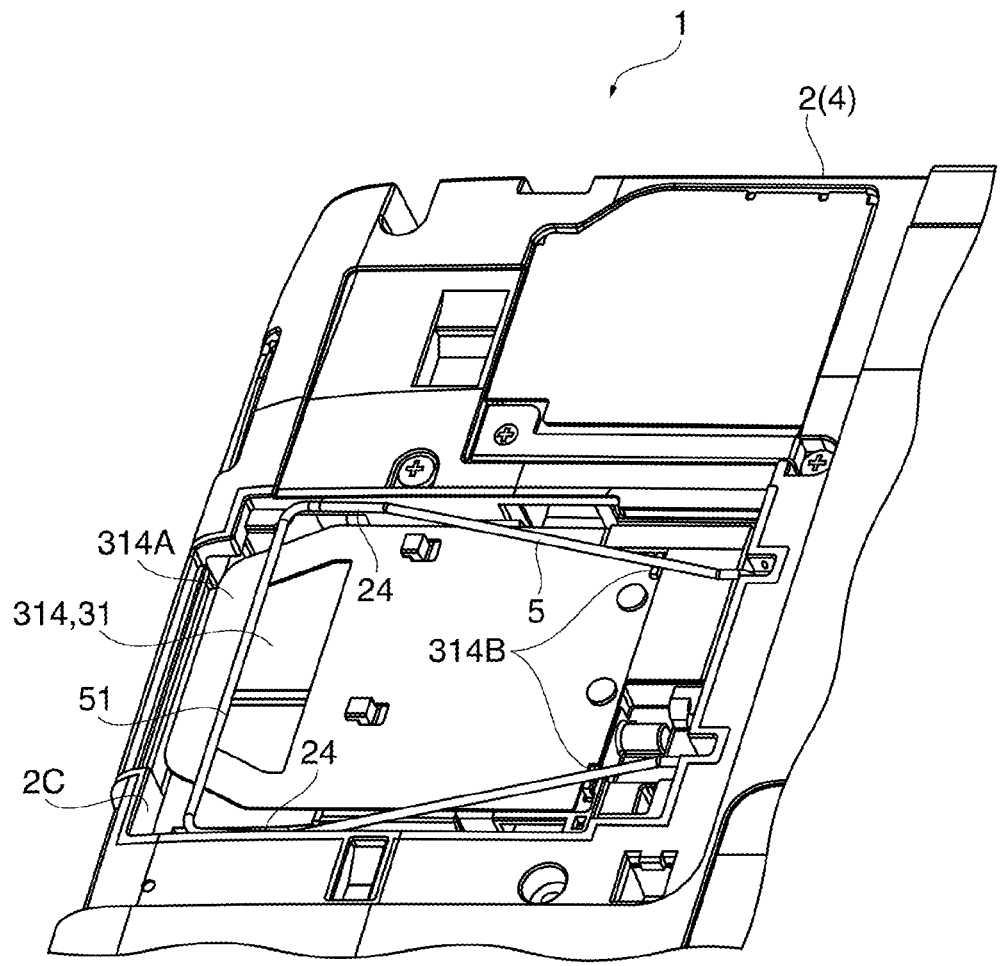
FIG. 7 is a perspective view illustrating a condition in which the resilient member is set at a close position.
Figure 8:
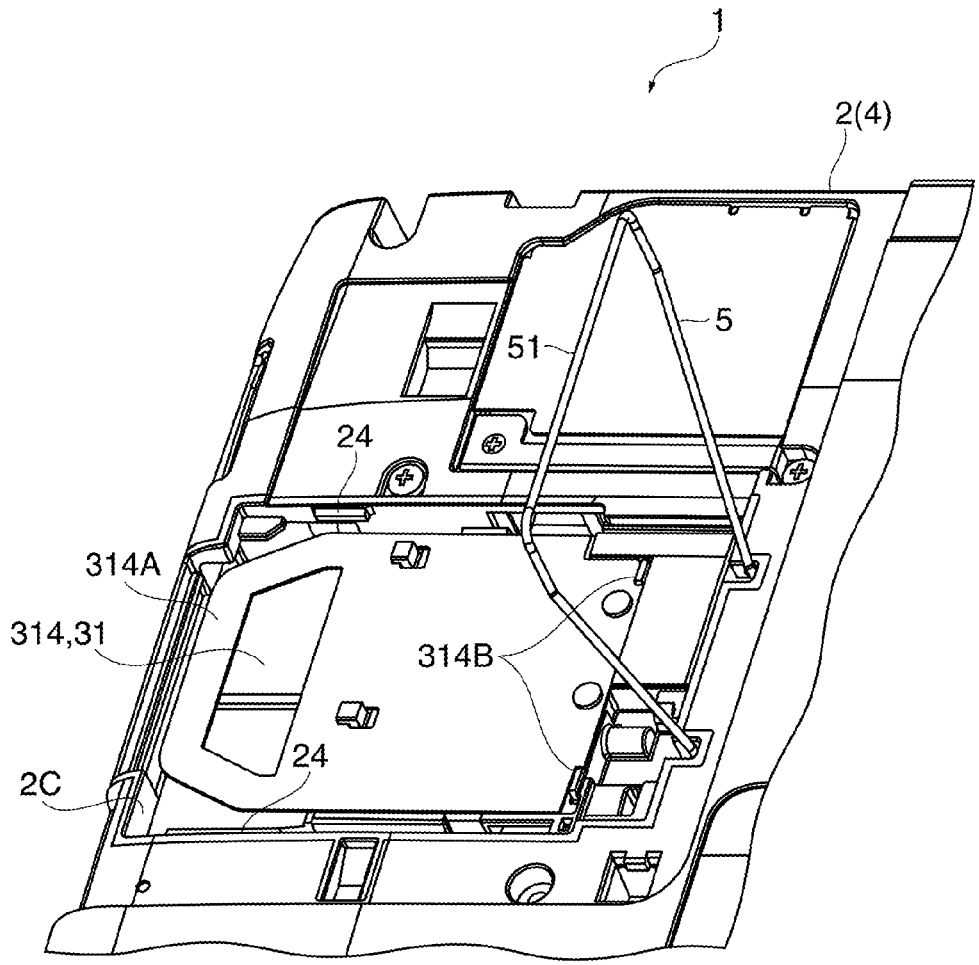
FIG. 8 is a perspective view illustrating a condition in which the resilient member is set at an open position.

FIG. 7 is a perspective view illustrating the resilient member 5 set at the close position. FIG. 8 is a perspective view illustrating the resilient member 5 set at the open position.

The work carried out at the time of replacement of the light source device 31 including the rotating operation of the resilient member 5 is now explained.

Initially, the lamp cover 2A1 (see FIG. 1) is removed from the external housing 2. Then, the end portion 51 of the resilient member 5 under the condition shown in FIG. 7 (close position of the resilient member 5) is raised with release of the engagement between the resilient member 5 and the engaging portions 24 and the contact between the resilient member 5 and the projections 314B to release the biasing force given by the resilient member 5 against the light source device 31. Subsequently, the resilient member 5 is rotated to come into the condition shown in FIG. 8 (open position of the resilient member 5). In this case, rotation of the resilient member 5 toward the close position is prevented by the function of the regulating portions 231 (see FIGS. 3 and 4) for regulating the movement of the resilient member 5.

Under the condition shown in FIG. 8, the light source device 31 is removed from the holder 4 by using the grip 314A.

Then, the new light source device 31 is accommodated and positioned within the holder 4 by engagement with the engaging recesses 371 of the optical component housing 37 (see FIG. 4). Subsequently, the end portion 51 of the resilient member 5 is lowered with release of the regulation given by the regulating portions 231 (see FIGS. 3 and 4) on the resilient member 5. The resilient member 5 is further rotated toward the inside of the holder 4 to come into contact with the projections 314B and engagement with the engaging portions 24. Under this condition, the light source device 31 subjected to the biasing force of the resilient member 5 can be accommodated in and supported by the holder 4.

According to the projector 1 in this embodiment, the following advantages can be offered.

According to this embodiment, the resilient member 5 is rotated from the close position to the open position at the time of replacement of the light source device 31. As a result, the biasing force of the resilient member 5 against the light source device 31 is released with release of the engagement between the resilient member 5 and the engaging portions 24, shifting to the condition in which the light source device 31 is allowed to be removed from the holder 4. Therefore, the light source device 31 can be brought into the condition of removal only by rotating the resilient member 5 from the close position to the open position. After the new light source device 31 is accommodated in the holder 4, the resilient member 5 is rotated from the open position to the close position. As a result, the new light source device 31 is subjected to the biasing force of the resilient member 5 and accommodated in and supported by the holder 4. Accordingly, replacement of the light source device 31 can be easily carried out as easy work which requires only rotation of the resilient member 5 toward the open position or the close position.

According to the structure of the resilient member 5 having the end portion 51 and the pair of the extending portions 52, the support portions 521 of the pair of the extending portions 52 are pivotally supported by the receiving portions 373. Thus, when the resilient member 5 is in the close position, the resilient member 5 can bias the light source device 31 well enough to cover the whole light source device 31. Accordingly, the light source device 31 can be supported by the holder 4 in a more preferable condition by using the simple structure.

The engaging portions 24 are disposed in the low temperature area of the light source device 31. Thus, thermal deterioration of the engaging portions 24 caused by high temperature can be avoided. Accordingly, the life of the engaging portions 24 increases, allowing the light source device 31 to be supported by the holder 4 in a preferable condition after the long-term use.

The distance between the engaging portions 24 and the biasing position (projections 314B) where the light source device 31 is subjected to the biasing force of the resilient member 5 is set longer than the distance between the biasing position and the receiving portions 373. In this case, the reaction force developed on the engaging portions 24 in response to the biasing force applied to the light source device 31 can be reduced. Thus, deterioration of the engaging portions 24 can be prevented even after the long-term use, allowing the light source device 31 to be supported by the holder 4 in a preferable condition without separation of the resilient member 5 from the engaging portions 24.

The light source device 31 is accommodated and positioned in the holder 4 by engagement with the engaging recesses 371 formed on the bottom of the optical component housing 37. In addition, the resilient member 5 biases the projections 314B of the light source device 31 and the light source device 31 is supported by the holder 4. In the arrangement in which the engaging recesses 371 and the projections 314B are disposed opposed to each other, the resilient member 5 biases the projections 314B and the light source device 31 supported on the holder 4 in a preferable condition. Therefore, the light source device 31 can be brought into firm engagement with the engaging recesses 371 disposed so as to be opposed to the projections 314B. Thus, shift of the light source device 31 from its proper position within the holder 4 can be securely prevented, allowing the light source device 31 to be supported by the holder 4 in a preferable condition.

The regulating portions 231 are provided for regulating the rotation of the resilient member 5 toward the inside of the holder 4. According to this structure, the resilient member 5 set at the open position during replacement of the light source device 31 does not rotate toward the inside of the holder 4. Thus, the replacement work does not become complicated.

Modifications of Embodiment

The invention is not limited to the embodiment described herein but includes modifications, improvements and the like of the embodiment without departing from the scope of the invention.

According to this embodiment, the holder 4 is constituted by both the external housing 2 and the optical component housing 37. However, the holder 4 may be formed only by the external housing 2 or only by the optical component housing 37. Alternatively, the holder 4 may be produced by components other than the external housing 2 and the optical component housing 37.

According to this embodiment, the resilient member 5 is U-shaped. However, the resilient member 5 may have other shapes such as L shape.

According to this embodiment, the engaging portions 24 are disposed in the low-temperature area of the light source device 31, or in the area away from the biasing position where the light source device 31 is subjected to the biasing force of the resilient member 5. However, the positions of the engaging portions 24 are not limited to these positions but may be arbitrarily determined.

According to this embodiment, the light source device 31 is subjected to the biasing force of the resilient member 5 in the vicinity of the receiving portions 373. However, the biasing position of the resilient member 5 may be located near the end portion 51.

According to this embodiment, the engaging recesses 371 are formed on the bottom of the holder 4. However, the engaging recesses 371 may be engaging projections. In this case, the engaging projections 314C of the light source device 31 become engaging recesses.

According to this embodiment, the optical unit 3 is substantially L-shaped in the plan view. However, the optical unit 3 may be substantially U-shaped in the plan view.

According to this embodiment, the transmission type liquid crystal panels 351 are equipped. However, reflection type liquid crystal panels may be employed in place of the transmission type liquid crystal panels 351.

According to this embodiment, the projector 1 including the liquid crystal panels 351 as the light modulation devices has been discussed. However, the projector 1 may incorporate other types of light modulation devices as long as they can modulate entering light and form an optical image. For example, the invention is applicable to a projector which includes a light modulation device other than a liquid crystal type such as a device using micromirrors.

According to this embodiment, the front type projector 1 whose projection direction of image light onto the projection surface is substantially equivalent to the viewing direction of an image corresponding to the image light has been discussed. However, the invention is applicable to a rear type projector whose projection direction and viewing direction are opposite to each other.

The light source device 31 is not limited to the type including the light source lamp 311 but may be a type including a solid light source such as LED (light emitting diode).

Accordingly, the technology of the invention is applicable to a projector used for presentation, home theater or other purposes as preferable application.

What is claimed is:

1. A projector comprising:
   a light source device;
   a holder that accommodates the light source device and includes a receiving portion and an engaging portion; and
   a resilient member comprising a bent bar-shaped metal component pivotally supported in the receiving portion and configured to engage with the engaging portion when the light source device is accommodated in the holder and bias the light source device toward the holder, wherein
   the resilient member is configured to rotate toward the inside and outside of the holder,
   the engaging portion is configured to engage with the resilient member to regulate the rotation of the resilient member toward the outside of the holder,
   the light source device shifts to the condition in which the light source device is allowed to be removed from the holder by releasing the biasing force against the light source device by rotating the resilient member toward the outside of the holder, and
   the engaging portion is disposed at a back of a reflector of the light source device and the receiving portion is disposed at a front of the reflector of the light source device, as viewed in an emitting direction of light from the light source device.

2. The projector according to claim 1, wherein the engaging portion is disposed in a low-temperature area of the light source device.

3. The projector according to claim 1, wherein a distance between the engaging portion and a biasing position where the light source device is subjected to a biasing force of the resilient member is longer than a distance between the biasing position and the receiving portion.

4. The projector according to claim 1, wherein
   the light source device includes a first engaging section positioned with respect to the holder,
   the holder includes a second engaging section engaging with the first engaging section, and
   the resilient member biases the position of the light source device corresponding to the position where the first engaging section and the second engaging section engage.

5. The projector according to claim 1, wherein the holder has a regulating portion configured to regulate the rotation of the resilient member positioned at the outside of the holder.

6. The projector according to claim 1, further comprising: an external housing forming an external casing, and wherein the holder is provided in the external housing.

7. The projector according to claim 1, wherein the engaging portion is provided on an opening edge of an opening of the holder.

8. The projector according to claim 1, wherein
   the holder includes a plurality of receiving portions,
   the resilient member has an end portion extending in one direction, and a plurality of extending portions extending in another direction crossing the one direction, connected at one end with the end portion, and pivotally supported at the other end by each receiving portion.

9. A projector comprising:
   a light source device;
   a holder that accommodates the light source device and includes a receiving portion and an engaging portion; and
   a resilient member comprising a bent bar-shaped metal component pivotally supported in the receiving portion and configured to engage with the engaging portion when the light source device is accommodated in the holder and bias the light source device toward the holder, wherein
   the light source device includes a first engaging section positioned with respect to the holder,
   the holder includes a second engaging section engaging with the first engaging section,
   the resilient member is configured to rotate toward the inside and outside of the holder and the resilient member biases the position of the light source device corresponding to the position where the first engaging section and the second engaging section engage, and
   the engaging portion is configured to engage with the resilient member to regulate the rotation of the resilient member toward the outside of the holder.

10. A projector comprising:
    a light source device;
    a holder that accommodates the light source device and includes a receiving portion and an engaging portion; and
    a resilient member comprising a bent bar-shaped metal component pivotally supported in the receiving portion and configured to engage with the engaging portion when the light source device is accommodated in the holder and bias the light source device toward the holder, wherein
    the resilient member is configured to rotate toward the inside and outside of the holder,
    the engaging portion is configured to engage with the resilient member to regulate the rotation of the resilient member toward the outside of the holder,
    the light source device shifts to the condition in which the light source device is allowed to be removed from the holder by releasing the biasing force against the light source device by rotating the resilient member toward the outside of the holder, and
    a distance between the engaging portion and a biasing position where the light source device is subjected to a biasing force of the resilient member is longer than a distance between the biasing position and the receiving portion.

11. A projector comprising:
    a light source device;
    a holder that accommodates the light source device and includes a plurality of receiving portions and an engaging portion; and
    a resilient member comprising a bent bar-shaped metal component and having an end portion extending in one direction and a plurality of extending portions extending in another direction crossing the one direction, connected at one end with the end portion, and pivotally supported at the other end by each receiving portion and configured to engage with the engaging portion when the light source device is accommodated in the holder and bias the light source device toward the holder, wherein
    the resilient member is configured to rotate toward the inside and outside of the holder,
    the engaging portion is configured to engage with the resilient member to regulate the rotation of the resilient member toward the outside of the holder, and the light source device shifts to the condition in which the light source device is allowed to be removed from the holder by releasing the biasing force against the light source device by rotating the resilient member toward the outside of the holder.

\* \* \* \* \*